US010165754B2

(12) United States Patent
Wright

(10) Patent No.: US 10,165,754 B2
(45) Date of Patent: Jan. 1, 2019

(54) ANIMAL BATHING ASSEMBLY

(71) Applicant: Cassandra Wright, Chicago, IL (US)

(72) Inventor: Cassandra Wright, Chicago, IL (US)

(*) Notice: Subject to any disclaimer, the term of this patent is extended or adjusted under 35 U.S.C. 154(b) by 560 days.

(21) Appl. No.: 14/873,969

(22) Filed: Oct. 2, 2015

(65) Prior Publication Data

US 2017/0094939 A1    Apr. 6, 2017

(51) Int. Cl.
*A01K 13/00*    (2006.01)

(52) U.S. Cl.
CPC .................... *A01K 13/001* (2013.01)

(58) Field of Classification Search
CPC ..................................................... A01K 13/001
See application file for complete search history.

(56) References Cited

U.S. PATENT DOCUMENTS

| | | | |
|---|---|---|---|
| 4,020,796 A | 5/1977 | Grifa | |
| 4,382,424 A | 5/1983 | Altissimo | |
| 4,407,234 A * | 10/1983 | Kleman | A01K 13/001 119/672 |
| 4,505,229 A | 3/1985 | Altissimo | |
| 4,549,502 A | 10/1985 | Namdari | |
| 5,448,966 A | 9/1995 | McKinnon et al. | |
| 5,724,918 A | 3/1998 | Navalon-Chicote | |
| 5,769,029 A | 6/1998 | Marshall | |
| D493,259 S | 9/2004 | Itoiz Oroz | |
| 7,497,188 B2 | 3/2009 | Cho | |
| 8,186,307 B2 | 5/2012 | Moharram et al. | |
| 2005/0211270 A1* | 9/2005 | Wheelwright | A01K 13/001 134/6 |
| 2007/0289548 A1* | 12/2007 | Smoot | A01K 13/001 119/668 |
| 2015/0366163 A1* | 12/2015 | Carter | A01K 13/001 119/678 |
| 2016/0128302 A1* | 5/2016 | Stauber | A01K 13/001 119/671 |

* cited by examiner

*Primary Examiner* — Jessica B Wong

(57) ABSTRACT

An animal bathing assembly includes a housing that may have an animal placed therein. A washing unit is coupled to the housing. The washing unit dispenses a fluid onto the animal when the animal is positioned within the housing. A plurality of scrubbing units is provided an each of the scrubbing units is coupled to the housing. Each of the scrubbing unit scrubs the animal when the animal is positioned within the housing. A drying unit is coupled to the housing. The drying unit urges air onto the animal thereby facilitating the animal to be dried. A control is coupled to the housing and the control may be manipulated. The control is electrically coupled to the washing unit, the scrubbing unit and the drying unit. The control controls operational parameters of the washing unit, the scrubbing unit and the drying unit.

16 Claims, 6 Drawing Sheets

ANIMAL BATHING ASSEMBLY

BACKGROUND OF THE DISCLOSURE

Field of the Disclosure

The disclosure relates to bathing systems and more particularly pertains to a new bathing system for cleaning fur of an animal.

SUMMARY OF THE DISCLOSURE

An embodiment of the disclosure meets the needs presented above by generally comprising a housing that may have an animal placed therein. A washing unit is coupled to the housing. The washing unit dispenses a fluid onto the animal when the animal is positioned within the housing. A plurality of scrubbing units is provided an each of the scrubbing units is coupled to the housing. Each of the scrubbing unit scrubs the animal when the animal is positioned within the housing. A drying unit is coupled to the housing. The drying unit urges air onto the animal thereby facilitating the animal to be dried. A control is coupled to the housing and the control may be manipulated. The control is electrically coupled to the washing unit, the scrubbing unit and the drying unit. The control controls operational parameters of the washing unit, the scrubbing unit and the drying unit.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
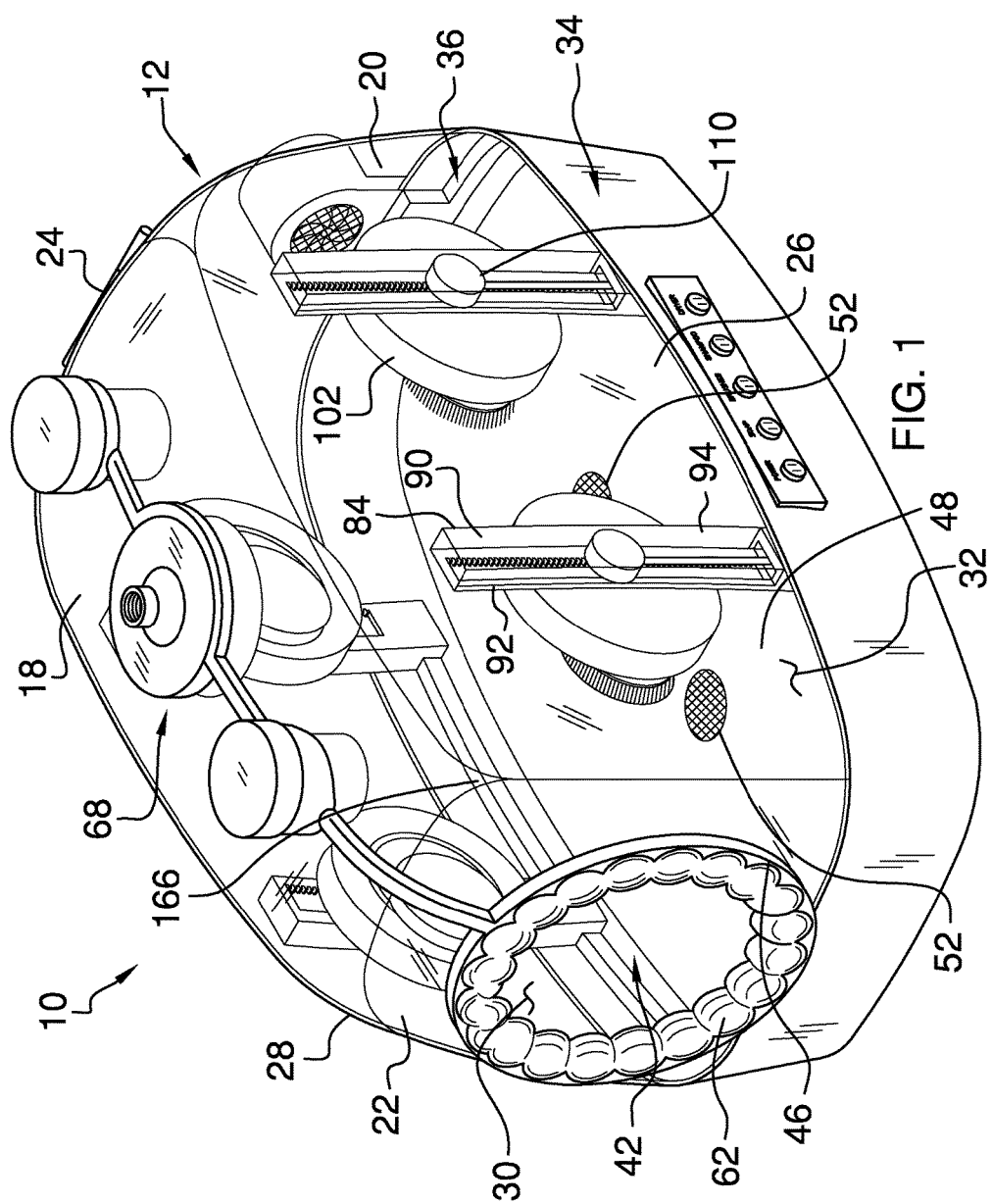
FIG. 1 is a perspective view of an animal bathing assembly according to an embodiment of the disclosure.
Figure 2:
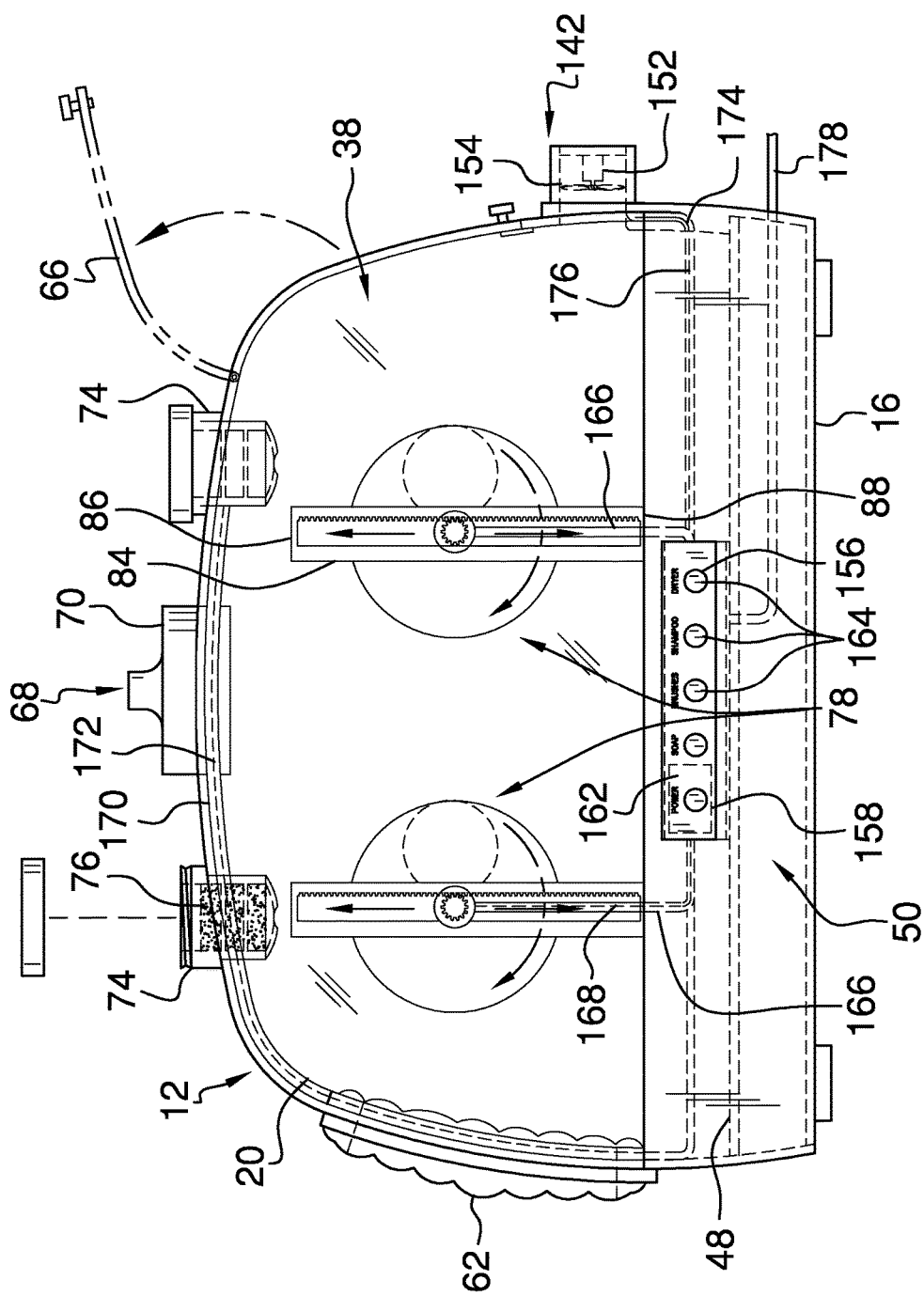
FIG. 2 is a front view of an embodiment of the disclosure.
Figure 3:
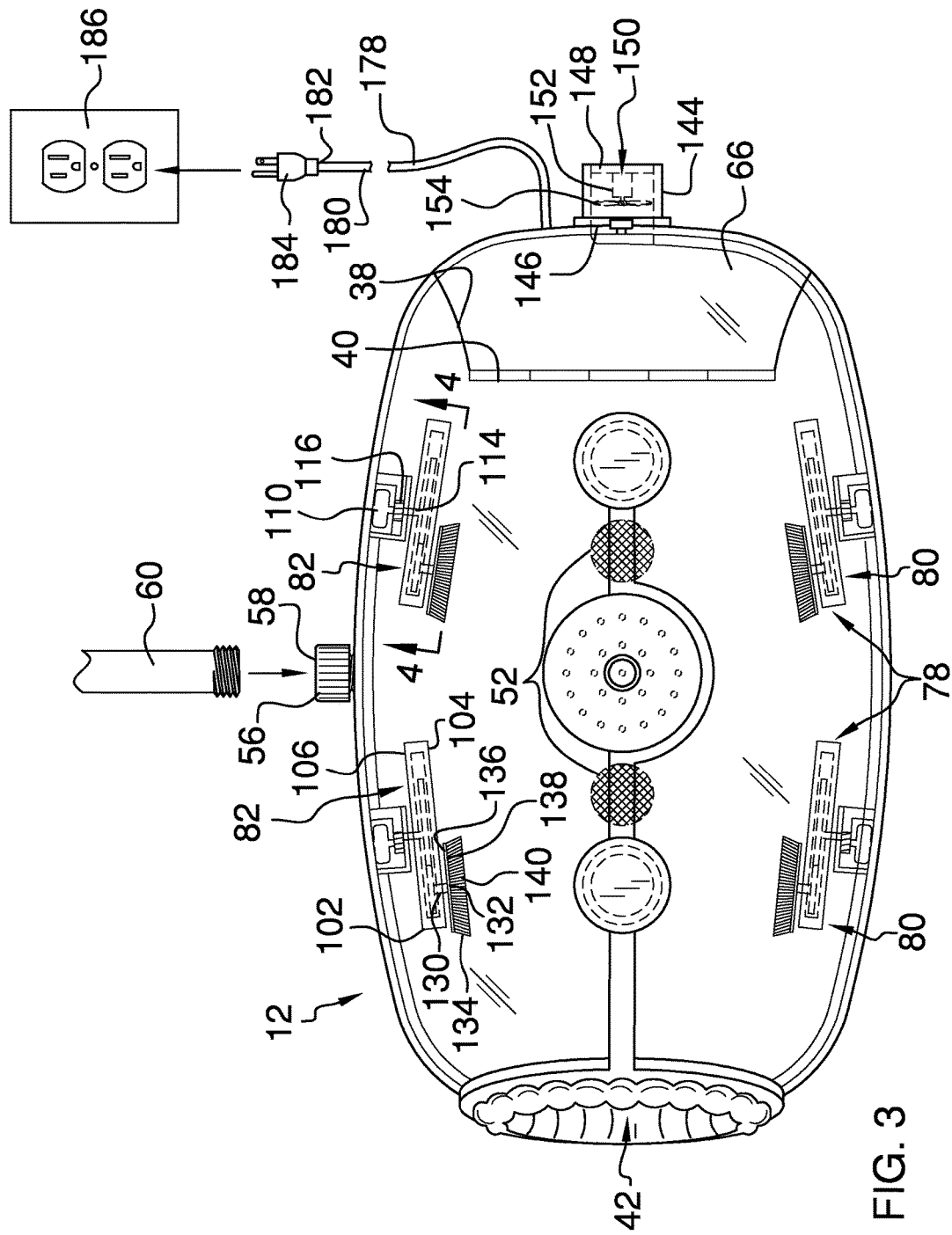
FIG. 3 is a top view of an embodiment of the disclosure.
Figure 4:
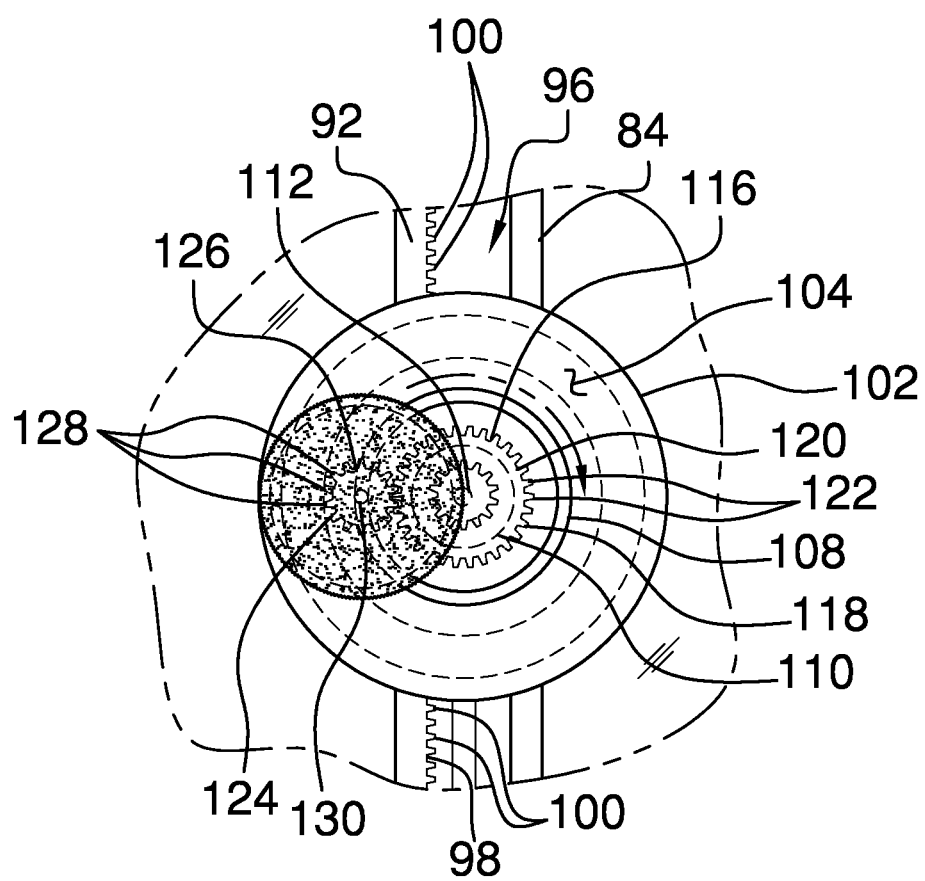
FIG. 4 is a cross sectional view taken along line 4-4 of FIG. 3 of an embodiment of the disclosure.
Figure 5:
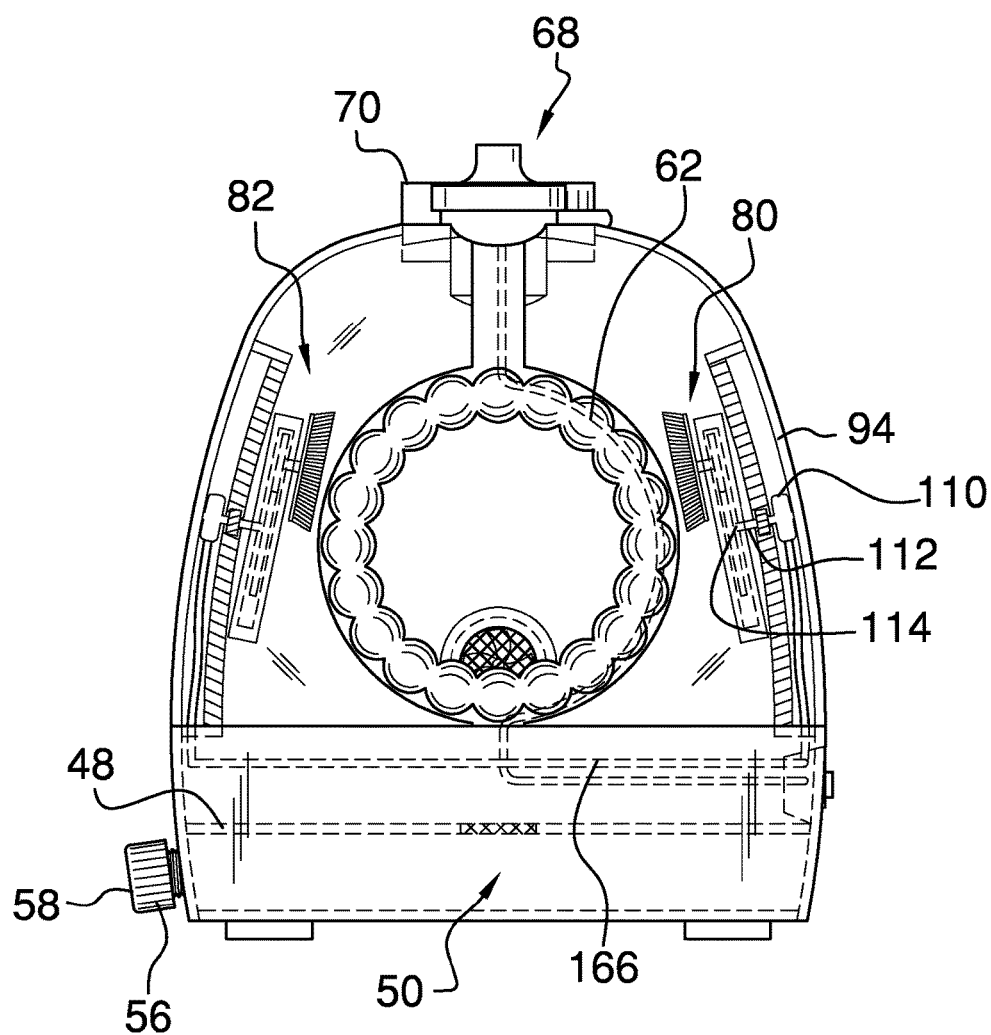
FIG. 5 is a right side phantom view of an embodiment of the disclosure.
Figure 6:
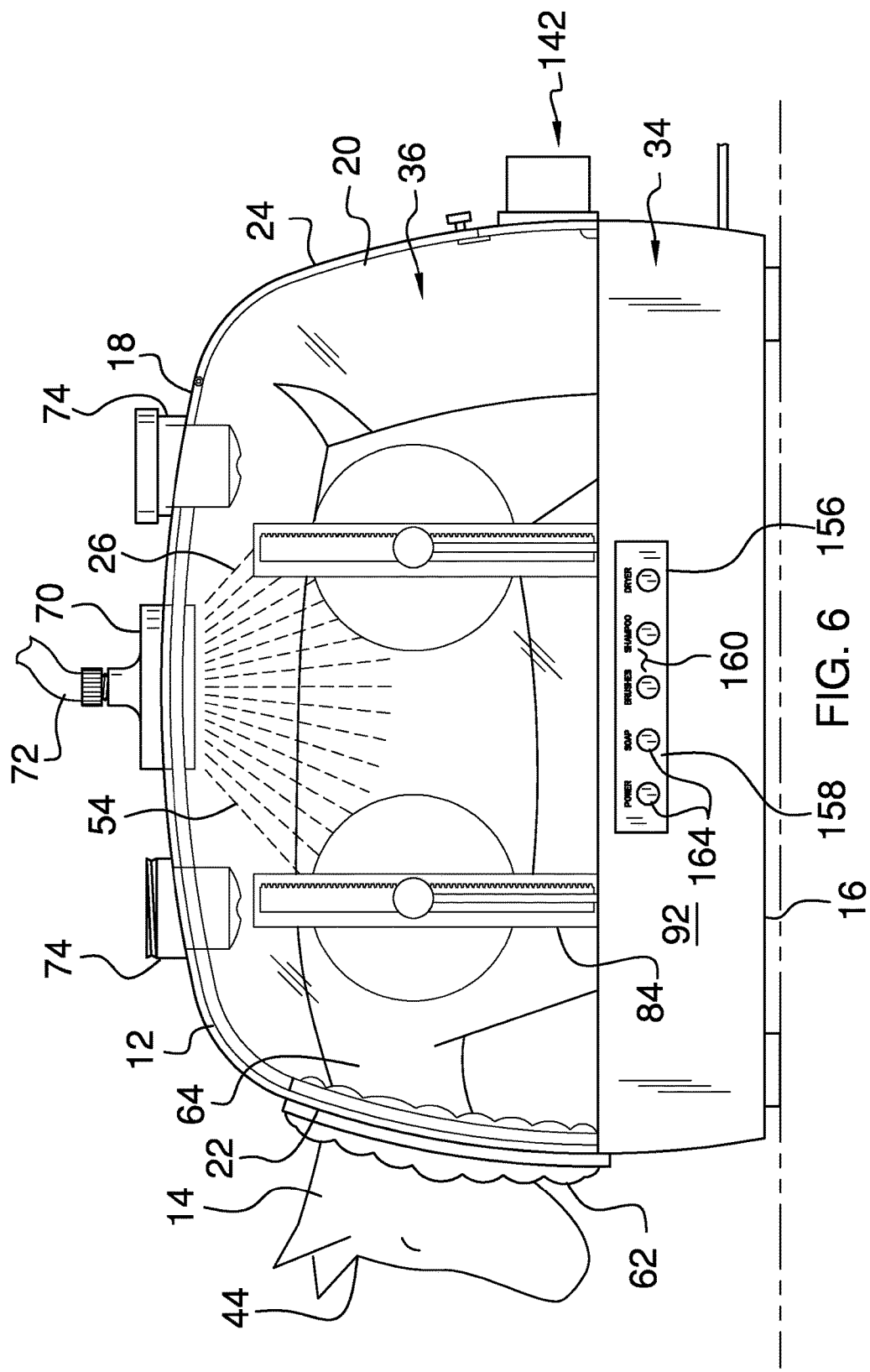
FIG. 6 is a perspective in-use view of an embodiment of the disclosure.

With reference now to the drawings, and in particular to FIGS. 1 through 6 thereof, a new bathing system embodying the principles and concepts of an embodiment of the disclosure and generally designated by the reference numeral 10 will be described.

As best illustrated in FIGS. 1 through 6, the animal bathing assembly 10 generally comprises a housing 12 that may have an animal 14 placed therein. The housing 12 has a bottom wall 16, a top wall 18 and a peripheral wall 20 extending between the top wall 18 and the bottom wall 16. The peripheral wall 20 has a front side 22, a back side 24, a first lateral side 26 and a second lateral side 28. The peripheral wall 20 has an inner surface 30 and an outer surface 32. The animal 14 may be a small breed canine such as a bichon frise or the like.

The peripheral wall 20 has a lower section 34 and an upper section 36. The upper section 36 is comprised of a translucent material. The upper section 36 curves inwardly between the lower section 34 and the top wall 18. Thus, the housing 12 has a substantially trapezoidal shape.

The back side 24 has a first opening 38 extending therethrough. The first opening 38 may insertably receive the animal 14 thereby facilitating the animal 14 to be positioned within the housing 12. The first opening 38 has a top bounding edge 40. The front side 24 has a second opening 42 extending therethrough. The second opening 42 may have a head 44 of the animal 14 extending outwardly therefrom when the animal 14 is placed in the housing 12. The second opening 42 has a bounding edge 46.

The housing 12 has a medial wall 48 that is spaced from the bottom wall 16 to define a reservoir 50 between the medial wall 48 and the bottom wall 16. The medial wall 48 extends between the front side 22, the back side 24, the first lateral side 26 and the second lateral side 28. Thus, the medial wall 48 may support the animal 14 when the animal 14 is placed within the housing 12. The medial wall 48 has a pair of drains 52 extending therethrough. Thus, each of the drains 52 may have a fluid 54 pass through each of the drains 52 and into the reservoir 50. The drains 52 are spaced apart from each other.

A coupler 56 is attached to and extends away from the peripheral wall 20 of the housing 14 such that the coupler 56 is in fluid communication with the reservoir 50. The coupler 56 has a distal end 58 with respect to the housing 12. The distal end 58 of the coupler 56 is open and the distal end 58 of the coupler 56 may be fluidly coupled to a fluid receptacle 60. Thus, the fluid 54 may be drained from the reservoir 50. The fluid receptacle 60 may be a water hose or the like and the fluid 54 may be water.

A gasket 62 is coupled to the bounding edge 46 of the second opening 42. The gasket 62 may engage a neck 64 of the animal 14 thereby facilitating the gasket 62 to inhibit the fluid 54 from escaping the housing 12. A door 66 is hingedly coupled to the housing 12 such that the door 66 is positionable in an open position and a closed position. The door 66 is hingedly coupled to the top bounding edge 40 of the first opening 38 such that the first opening 38 is exposed when the door 66 is positioned in the open position. The first opening 38 is completely covered when the door 66 is positioned in the closed position.

A washing unit 68 is coupled to the housing 12. The washing unit 68 dispenses the fluid 54 onto the animal 14 when the animal 14 is positioned within the housing 12. The washing unit 68 comprises a shower head 70. The shower head 70 may be fluidly coupled to a fluid source 72 thereby facilitating the shower head 70 to spray the fluid outwardly therefrom. The fluid source 72 may comprise a water hose or the like. The shower head 70 extends through the top wall 18 such that the shower head 70 may dispense the fluid 54 onto the animal 14. The shower head 70 is centrally positioned on the top wall 18.

A pair of dispensers 74 is provided. Each of the dispensers 74 may receive a liquid detergent 76 thereby facilitating each of the dispensers 74 to selectively release the liquid detergent 76. The liquid detergent 76 may comprise a liquid soap or the like. Each of the dispensers 74 extends through the top wall 18. Thus, each of the dispensers 74 may release the liquid detergent 76 onto the animal 14. Each of the dispensers 74 is positioned on opposite sides of the shower head 70. Each of the dispensers 74 may comprise an electrically actuated fluid dispenser or the like.

A plurality of scrubbing units 78 is provided. Each of the scrubbing units 78 is coupled to the housing 12. Each of the scrubbing unit 78 scrubs the animal 14 when the animal 14 is positioned within the housing 12. The plurality of scrubbing units 78 comprises a first pair of the scrubbing units 80 and a second pair of the scrubbing units 82.

Each of the first pair of scrubbing units 80 is positioned on the first lateral side 26 of the housing 12. The first pair of scrubbing units 80 is spaced apart from each other. Each of the second pair of scrubbing units 82 is positioned on the second lateral side 28 of the housing 12. The second pair of scrubbing units 82 is spaced apart from each other.

Each of the scrubbing units 78 comprises a track 84 that has an upper end 86, a lower end 88 and an outer wall 90 extending between the upper end 86 and the lower end 88. The track 84 is substantially hollow. The outer wall 90 has a front side 92 and a back side 94. The front side 94 of the track 84 has a gear opening 96 extending into an interior of the track 84. The gear opening 96 extends between the upper end 86 and the lower end 88.

The gear opening 96 has a lateral bounding edge 98. The lateral bounding edge 98 comprises a plurality of teeth 100. The teeth 100 are spaced apart from each other and are distributed along the lateral bounding edge 98. The back side 94 of the track 84 is coupled to the inner surface 30 of the housing 12 such that the track 84 is vertically oriented.

A disk 102 is provided that has a front surface 104 and a back surface 106. The disk 102 is substantially hollow. The front surface 104 has a slot 108 extending into an interior of the disk 102. The slot 108 is continuous such that the slot 108 forms a closed ring.

A motor 110 is positioned within the interior of the track 84. The motor 110 rotates in a first direction and a second direction. The motor 110 may comprise an electrical motor or the like. A first shaft 112 is rotatably coupled to and extends away from the motor 110 such that the motor 110 rotates the first shaft 112 when the motor 110 is turned on. The first shaft 112 extends outwardly from the gear opening 96 and through the back surface 106 of the disk 102. The first shaft 112 has a distal end 114 with respect to the motor 110 and the distal end 114 of the first shaft 112 is positioned within the interior of the disk 102.

A first gear 116 is provided. The first gear 116 has the first shaft 112 extending therethrough such that the first shaft 112 rotates the first gear 116 when the motor 110 is turned on. The first gear 116 engages the teeth 110 on the track 84. Thus, the disk 102 is alternately urged upwardly and downwardly along the track 84 when the motor 110 rotates in a respective one of the first direction and the second direction.

A second gear 118 is coupled to the distal end 114 of the first shaft 112 such that the first shaft 112 rotates the second gear 118 when the motor 110 rotates the first shaft 112. The second gear 118 has a peripheral edge 120. The peripheral edge 120 comprises a plurality of teeth 122. The teeth 122 corresponding to the second gear 118 are spaced apart from each other and are distributed around the peripheral edge 120.

A third gear 124 is positioned within the disk 102. The third gear 124 has an outer edge 126 and the outer edge 126 comprises a plurality of teeth 128. The teeth 128 corresponding to the third gear 124 are spaced apart from each other and are distributed around the outer edge 126. The teeth 128 corresponding to the third gear 124 engage the teeth 122 corresponding to the second gear 118. Thus, the third gear 124 is urged to orbit the second gear 118 when the motor 110 rotates the first shaft 112.

A second shaft 130 is coupled to and extends away from the third gear 124. The second shaft 130 extends outwardly through the slot 108 in the disk 102. The third gear 124 rotates the second shaft 130 when the motor 110 is turned on. The second shaft 130 has a distal end 132 with respect to the third gear 124.

A brush 134 is provided that has a back side 136 and a front side 138. The back side 136 of the brush 134 is coupled to the distal end 132 of the second shaft 130. Thus, the brush 134 is rotated when the motor 110 is turned on. The brush 134 scrubs the animal 14 when the motor 110 is turned on. The brush 134 travels around the slot 108 in the disk 102 when the motor 110 is turned on. The front side 138 of the brush 134 has a plurality of bristles 140 coupled thereto. Thus, each of the bristles 140 may frictionally engage the animal 14.

A drying unit 142 is coupled to the housing 12. The drying unit 142 urges air onto the animal 14 thereby facilitating the animal 14 to be dried. The drying unit 142 comprises a cup 144 that has a front side 146 and a back side 148. The front side 146 of the cup 144 is open and the front side 146 of the cup 144 extends through the back side 24 of the housing 12. The back side 148 of the cup 144 has a vent 150 extending therethrough and the cup 144 is positioned beneath the first opening 38.

A fan motor 152 is positioned within the cup 144. The fan motor 152 may comprise an electrical motor or the like. A fan 154 is rotatably coupled to the fan motor 152. The fan 154 urges air inwardly through the vent 150 and outwardly through the front side 146 of the cup 144 when the fan motor 152 is turned on.

A control 156 is coupled to the housing 12 and the control 156 may be manipulated. The control 156 is electrically coupled to the washing unit 68, the scrubbing units 78 and the drying unit 142. The control 156 controls operational parameters of the washing unit 68, the scrubbing units 78 and the drying unit 142. The control 156 comprises a panel 158 that is coupled to the outer surface 32 corresponding to the first lateral side 26 of the housing 12. Thus, the panel 158 is accessible and the panel 158 has an exposed surface 160.

A processor 162 is positioned within the panel 158. The processor 162 is electrically coupled to each of the pair of dispensers 74, the motor 110 corresponding to each of the scrubbing units 78 and the fan motor 152. The processor 162 determines a rotational speed of the motor 110 corresponding to each of the scrubbing units 78. Thus, the processor 162 establishes a duration of time for the disk 102 to travel upwardly and downwardly along the track 84. The processor 162 may comprise an electronic processor or the like. The processor 162 actuates the motor 110 corresponding to each of the scrubbing units 78 to rotate in the first direction when the disk 102 reaches the lower end 88 of the track 84. The processor 162 actuates the motor 110 corresponding to each of the scrubbing units 78 to rotate in the second direction when the disk 102 reaches the upper end 86 of the track 84.

A plurality of buttons 164 is provided. Each of the buttons 164 is positioned on the exposed surface 160 such that each of the buttons 164 may be manipulated. Each of the buttons 164 is electrically coupled to the processor 162. Each of the buttons 164 controls operational parameters of the washing unit 68, the scrubbing units 78 and the drying unit.

A plurality of motor conduits 166 is provided and each of the motor conduits 166 is coupled to the inner surface 30 of the housing 12. Each of the motor conduits 166 extends between the panel 158 and the motor 110 corresponding to an associated one of the scrubbing units 78. Each of the motor 110 conduits has a first conductor 168 positioned therein. The first conductor 168 is electrically coupled between the processor 162 and the motor 110 corresponding to the associated one of the scrubbing units 78.

A dispenser conduit 170 is coupled to the inner surface 30 of the housing 12. The dispenser conduit 170 extends between the panel 158 and each of the dispensers 74. The dispenser conduit 170 has a second conductor 172 that is positioned therein. The second conductor 172 is electrically coupled between the processor 162 and each of the dispensers 74.

A dryer conduit 174 is coupled to the inner surface 30 of the housing 12. The dryer conduit 174 extends between the panel 158 and the drying unit 142. The dryer conduit 174 has a third conductor 176 positioned therein. The third conductor 176 is electrically coupled between the processor 162 and the fan motor 152. Each of the motor conduits 166, the dispenser conduit 170 and the dryer conduit 174 prevents the fluid 54 from creating a short circuit between the processor 162 and the scrubbing units 78, the dispensers 74 and the drying unit 142.

A power supply 178 is coupled to the housing 12. The power supply 178 is electrically coupled to the processor 162. The power supply 178 comprises a cord 180 extending outwardly from the housing 12. The cord 180 has a distal end 182 with respect to the housing 12. The distal end 182 of the cord 180 has a plug 184 that is electrically coupled thereto. The plug 184 may be electrically coupled to a power source 186 and the power source 186 may comprise an electrical outlet or the like.

In use, the fluid source 72 is fluidly coupled to the shower head 70 and the fluid receptacle 60 is fluidly coupled to the coupler 56. The door 66 is positioned in the open position and the animal 14 is positioned within the housing 12. The animal's head 44 is extended outwardly from the second opening 42 and the door 66 is positioned in the closed position. The buttons 164 are manipulated to turn on the motor 110 in each of the scrubbing units 78 and to actuate each of the dispensers 74 to release the liquid detergent 76. Each of the brushes 134 scrub the animal 14 while the shower head 70 sprays the fluid 54 on the animal 14. The housing 12 inhibits the animal's 14 instinctive desire to shake the fluid 54 off of the animal 12. Thus, the housing 12 reduces the animal's 12 stress and anxiety while the animal 12 is being bathed. Additionally, the housing 12 inhibits the fluid 54 from being released into the area surrounding the housing 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An animal bathing assembly comprising:
    a housing being configured to have an animal placed therein;
    a washing unit being coupled to said housing wherein said washing unit is configured to dispense a fluid onto the animal when the animal is positioned within said housing;
    a plurality of scrubbing units, each of said scrubbing units being coupled to said housing wherein each of said scrubbing units is configured to scrub the animal when the animal is positioned within said housing;
    a drying unit being coupled to said housing wherein said drying unit is configured to urge air onto the animal thereby facilitating the animal to be dried;
    a control being coupled to said housing wherein said control is configured to be manipulated, said control being electrically coupled to said washing unit, said scrubbing unit and said drying unit such that said control controls operational parameters of said washing unit, said scrubbing unit and said drying unit;
    each of said scrubbing units comprises a track having an upper end, a lower end and an outer wall extending between said upper end and said lower end, said track being substantially hollow, said outer wall having a front side and a back side, said front side of said track having a gear opening extending into an interior of said track, said gear opening extending between said upper end and said lower end;
    said housing has an inner surface;
    said gear opening has a lateral bounding edge, said lateral bounding edge comprising a plurality of teeth, said teeth being spaced apart from each other and being distributed along said lateral bounding edge, said back side of said track being coupled to said inner surface of said housing such that said track is vertically oriented;
    a disk having a front surface and a back surface, said disk being substantially hollow, said front surface having a slot extending into an interior of said disk, said slot being continuous such that said slot forms a closed ring;
    a motor being positioned within said interior of said track, said motor rotating in a first direction and a second direction; and
    a first shaft being rotatably coupled to and extending away from said motor such that said motor rotates said first shaft when said motor is turned on, said first shaft extending outwardly from said gear opening and through said back surface of said disk, said first shaft having a distal end with respect to said motor, said distal end of said first shaft being positioned within said interior of said disk.

2. The assembly according to claim 1, wherein:
    said housing has a bottom wall, a top wall and a peripheral wall extending between said top wall and said bottom wall, said peripheral wall having a front side, a back side, a first lateral side and a second lateral side, said peripheral wall having an inner surface and an outer surface, said back side having an first opening extending therethrough wherein said first opening is configured to insertably receive the animal thereby facilitating the animal to be positioned within said housing, said first opening having a top bounding edge; and said front side having a second opening extending therethrough wherein said second opening is configured to have a head of the animal extending outwardly therefrom when the animal is placed in said housing, said second opening having a bounding edge.

3. The assembly according to claim 2, wherein:
said housing has a medial wall being spaced from said bottom wall to define a reservoir between said medial wall and said bottom wall, said medial wall extending between said front side, said back side, said first lateral side and said second lateral side wherein said medial wall is configured to support the animal when the animal is placed within said housing; and said medial wall having a pair of drains extending therethrough wherein each of said drains is configured to have the fluid pass through each of said drains and into said reservoir, said drains being spaced apart from each other.

4. The assembly according to claim 2, wherein said peripheral wall has a lower section and an upper section, said upper section being comprised of a translucent material, said upper section curving inwardly between said lower section and said top wall such that said housing has a substantially trapezoidal shape.

5. The assembly according to claim 3, further comprising:
a coupler being attached to and extending away from said peripheral wall of said housing such that said coupler is in fluid communication with said reservoir, said coupler having a distal end with respect to said housing, said distal end of said coupler being open wherein said distal end of said coupler is configured to be fluidly coupled to a fluid receptacle thereby facilitating the fluid to be drained from said reservoir;

a gasket being coupled to said bounding edge of said second opening wherein said gasket is configured to engage a neck of the animal thereby facilitating said gasket to inhibit the fluid from escaping said housing; and a door being hingedly coupled to said housing such that said door is positionable in an open position and a closed position, said door being hingedly coupled to said top bounding edge of said first opening such that said first opening is exposed when said door is positioned in said open position, said first opening being completely covered when said door is positioned in said closed position.

6. The assembly according to claim 1, wherein:
said housing has a top wall; and
said washing unit comprises a shower head being configured to be fluidly coupled to a fluid source thereby facilitating said shower head to spray the fluid outwardly therefrom, said shower head extending through said top wall wherein said shower head is configured to dispense the fluid onto the animal, said shower head being centrally positioned on said top wall.

7. The assembly according to claim 6, wherein said washing unit further comprises a pair of dispensers, each of said dispensers being configured to receive a liquid detergent thereby facilitating each of said dispensers to selectively release the liquid detergent, each of said dispensers extending through said top wall wherein each of said dispensers is configured to release the liquid detergent onto the animal, each of said dispensers being positioned on opposite sides of said shower head.

8. The assembly according to claim 2, wherein said plurality of scrubbing units comprises a first pair of said scrubbing units and a second pair of said scrubbing units, each of said first pair of scrubbing units being positioned on said first lateral side of said housing, said first pair of scrubbing units being spaced apart from each other, each of said second pair of scrubbing units being positioned on said second lateral side of said housing, said second pair of scrubbing units being spaced apart from each other.

9. The assembly according to claim 1, further comprising:
a first gear having said first shaft extending therethrough such that said first shaft rotates said first gear when said motor is turned on, said first gear engaging said teeth on said track such that said disk is alternately urged upwardly and downwardly along said track when said motor rotates in a respective one of said first direction and said second direction;

a second gear being coupled to said distal end of said first shaft such that said shaft rotates said second gear when said motor rotates said first shaft, said second gear having a peripheral edge, said peripheral edge comprising a plurality of teeth, said teeth corresponding to said second gear being spaced apart from each other and distributed around said peripheral edge; and a third gear being positioned within said disk, said third gear having an outer edge, said outer edge comprising a plurality of teeth, said teeth corresponding to said third gear being spaced apart from each other and distributed around said outer edge, said teeth corresponding to said third gear engaging said teeth corresponding to said second gear such that said third gear is urged to orbit said second gear when said motor rotates said first shaft.

10. The assembly according to claim 9, further comprising:
a second shaft being coupled to and extending away from said third gear such that said second shaft extends outwardly through said slot in said disk, said third gear rotating said second shaft when said motor is turned on, said second shaft having a distal end with respect to said third gear, and a brush having a back side and a front side, said back side of said brush being coupled to said distal end of said second shaft such that said brush is rotated when said motor is turned on wherein said brush is configured to scrub the animal when said motor is turned on, said brush travelling around said slot when said motor is turned on, said front side of said brush having a plurality of bristles being coupled thereto wherein each of said bristles is configured to frictionally engage the animal.

11. The assembly according to claim 1, wherein:
said housing has a back side and a first opening; and
said drying unit comprises:
a cup having a front side and a back side, said front side of said cup being open, said front side of said cup extending through said back side of said housing, said back side of said cup having a vent extending therethrough, said cup being positioned beneath said first opening, a fan motor being positioned within said cup, and
a fan being rotatably coupled to said fan motor, said fan urging air inwardly through said vents and outwardly through said front side of said cup when said fan motor is turned on.

12. The assembly according to claim 1, wherein:
said housing has an outer surface and a first lateral side; and
said control comprises a panel being coupled to said outer surface corresponding to said first lateral side of said housing wherein said panel is configured to be accessible, said panel having an exposed surface.

13. The assembly according to claim 12, further comprising:
a pair of dispensers;
a fan motor;
each of said scrubbing units comprises:
a motor;
a track having a lower end and an upper end, and
a disk;
a processor being positioned within said panel, said processor being electrically coupled to each of said pair of dispensers, said motor corresponding to each of said scrubbing units and said fan motor;
said processor determining a rotational speed of said motor corresponding to each of said scrubbing units such that said processor establishes a duration of time for said disk to travel upwardly and downwardly along said track, said processor actuating said motor corresponding to each of said scrubbing units to rotate in said first direction when said disk reaches said lower end of said track, said processor actuating said motor corresponding to each of said scrubbing units to rotate in said second direction when said disk reaches said upper end of said track; and
a plurality of buttons, each of said buttons being positioned on said exposed surface wherein each of said buttons is configured to be manipulated, each of said buttons being electrically coupled to said processor, each of said buttons controlling operational parameters of said washing unit, said scrubbing unit and said drying unit.

14. The assembly according to claim 13, further comprising:
said housing having an inner surface;
a plurality of motor conduits, each of said motor conduits being coupled to said inner surface of said housing, each of said motor conduits extending between said panel and said motor corresponding to an associated one of said scrubbing units, each of said motor conduits having a first conductor positioned therein, said first conductor being electrically coupled between said processor and said motor corresponding to said associated scrubbing unit;
a dispenser conduit being coupled to said inner surface of said housing, said dispenser conduit extending between said panel and each of said dispensers, said dispenser conduit having a second conductor being positioned therein, said second conductor being electrically coupled between said processor and each of said dispensers; and
a dryer conduit being coupled to said inner surface of said housing, said dryer conduit extending between said panel and said drying unit, said dryer conduit having a third conductor being positioned therein, said third conductor being electrically coupled between said processor and said fan motor.

15. The assembly according to claim 1, further comprising:
a processor; and
a power supply being coupled to said housing, said power supply being electrically coupled to said processor, said power supply comprising a cord extending outwardly from said housing, said cord having a distal end with respect to said housing, said distal end of said cord having a plug being electrically coupled thereto, said plug being configured to be electrically coupled to a power source.

16. An animal bathing assembly comprising:
a housing being configured to have an animal placed therein, said housing having a bottom wall, a top wall and a peripheral wall extending between said top wall and said bottom wall, said peripheral wall having a front side, a back side, a first lateral side and a second lateral side, said back side having an first opening extending therethrough wherein said first opening is configured to insertably receive the animal thereby facilitating the animal to be positioned within said housing, said first opening having a top bounding edge, said front side having a second opening extending therethrough wherein said second opening is configured to have a head of the animal extending outwardly therefrom when the animal is placed in said housing, said second opening having a bounding edge, said peripheral wall having an inner surface and an outer surface, said housing having a medial wall being spaced from said bottom wall to define a reservoir between said medial wall and said bottom wall, said medial wall extending between said front side, said back side, said first lateral side and said second lateral side wherein said medial wall is configured to support the animal when the animal is placed within said housing, said medial wall having a pair of drains extending therethrough wherein each of said drains is configured to have a fluid pass through each of said drains and into said reservoir, said drains being spaced apart from each other, said peripheral wall having a lower section and an upper section, said upper section being comprised of a translucent material, said upper section curving inwardly between said lower section and said top wall such that said housing has a substantially trapezoidal shape;
a coupler being attached to and extending away from said peripheral wall of said housing such that said coupler is in fluid communication with said reservoir, said coupler having a distal end with respect to said housing, said distal end of said coupler being open wherein said distal end of said coupler is configured to be fluidly coupled to a fluid receptacle thereby facilitating the fluid to be drained from said reservoir;
a gasket being coupled to said bounding edge of said second opening wherein said gasket is configured to engage a neck of the animal thereby facilitating said gasket to inhibit the fluid from escaping said housing;
a door being hingedly coupled to said housing such that said door is positionable in an open position and a closed position, said door being hingedly coupled to said top bounding edge of said first opening such that said first opening is exposed when said door is positioned in said open position, said first opening being completely covered when said door is positioned in said closed position;
a washing unit being coupled to said housing wherein said washing unit is configured to dispense the fluid onto the animal when the animal is positioned within said housing, said washing unit comprising:
  a shower head being configured to be fluidly coupled to a fluid source thereby facilitating said shower head to spray the fluid outwardly therefrom, said shower head extending through said top wall wherein said shower head is configured to dispense the fluid onto the animal, said shower head being centrally positioned on said top wall, and
  a pair of dispensers, each of said dispensers being configured to receive a liquid detergent thereby facilitating each of said dispensers to selectively release the liquid detergent, each of said dispensers extending through said top wall wherein each of said dispensers is configured to release the liquid detergent onto the animal, each of said dispensers being positioned on opposite sides of said shower head;
a plurality of scrubbing units, each of said scrubbing units being coupled to said housing wherein each of said scrubbing unit is configured to scrub the animal when the animal is positioned within said housing, said plurality of scrubbing units comprising a first pair of said scrubbing units and a second pair of said scrubbing units, each of said first pair of scrubbing units being positioned on said first lateral side of said housing, said first pair of scrubbing units being spaced apart from each other, each of said second pair of scrubbing units being positioned on said second lateral side of said housing, said second pair of scrubbing units being spaced apart from each other, each of said scrubbing units comprising:
  a track having an upper end, a lower end and an outer wall extending between said upper end and said lower end, said track being substantially hollow, said outer wall having a front side and a back side, said front side of said track having a gear opening extending into an interior of said track, said gear opening extending between said upper end and said lower end, said gear opening having a lateral bounding edge, said lateral bounding edge comprising a plurality of teeth, said teeth being spaced apart from each other and being distributed along said lateral bounding edge, said back side of said track being coupled to said inner surface of said housing such that said track is vertically oriented,
  a disk having a front surface and a back surface, said disk being substantially hollow, said front surface having a slot extending into an interior of said disk, said slot being continuous such that said slot forms a closed ring,
  a motor being positioned within said interior of said track, said motor rotating in a first direction and a second direction,
  a first shaft being rotatably coupled to and extending away from said motor such that said motor rotates said first shaft when said motor is turned on, said first shaft extending outwardly from said gear opening and through said back surface of said disk, said first shaft having a distal end with respect to said motor, said distal end of said first shaft being positioned within said interior of said disk,
  a first gear having said first shaft extending therethrough such that said first shaft rotates said first gear when said motor is turned on, said first gear engaging said teeth on said track such that said disk is alternately urged upwardly and downwardly along said track when said motor rotates in a respective one of said first direction and said second direction,
  a second gear being coupled to said distal end of said first shaft such that said shaft rotates said second gear when said motor rotates said first shaft, said second gear having a peripheral edge, said peripheral edge comprising a plurality of teeth, said teeth corresponding to said second gear being spaced apart from each other and distributed around said peripheral edge,
  a third gear being positioned within said disk, said third gear having an outer edge, said outer edge comprising a plurality of teeth, said teeth corresponding to said third gear being spaced apart from each other and distributed around said outer edge, said teeth corresponding to said third gear engaging said teeth corresponding to said second gear such that said third gear is urged to orbit said second gear when said motor rotates said first shaft,
  a second shaft being coupled to and extending away from said third gear such that said second shaft extends outwardly through said slot in said disk, said third gear rotating said second shaft when said motor is turned on, said second shaft having a distal end with respect to said third gear, and
  a brush having a back side and a front side, said back side of said brush being coupled to said distal end of said second shaft such that said brush is rotated when said motor is turned on wherein said brush is configured to scrub the animal when said motor is turned on, said brush travelling around said slot when said motor is turned on, said front side of said brush having a plurality of bristles being coupled thereto wherein each of said bristles is configured to frictionally engage the animal;
a drying unit being coupled to said housing wherein said drying unit is configured to urge air onto the animal thereby facilitating the animal to be dried, said drying unit comprising:
  a cup having a front side and a back side, said front side of said cup being open, said front side of said cup extending through said back side of said housing, said back side of said cup having a vent extending therethrough, said cup being positioned beneath said first opening,
  a fan motor being positioned within said cup, and
  a fan being rotatably coupled to said fan motor, said fan urging air inwardly through said vents and outwardly through said front side of said cup when said fan motor is turned on; and
a control being coupled to said housing wherein said control is configured to be manipulated, said control being electrically coupled to said washing unit, said scrubbing unit and said drying unit such that said control controls operational parameters of said washing unit, said scrubbing unit and said drying unit, said control comprising:
  a panel being coupled to said outer surface corresponding to said first lateral side of said housing wherein said panel is configured to be accessible, said panel having an exposed surface,
  a processor being positioned within said panel, said processor being electrically coupled to each of said pair of dispensers, said motor corresponding to each of said scrubbing units and said fan motor, said processor determining a rotational speed of said motor corresponding to each of said scrubbing units such that said processor establishes a duration of time for said disk to travel upwardly and downwardly along said track, said processor actuating said motor corresponding to each of said scrubbing units to rotate in said first direction when said disk reaches said lower end of said track, said processor actuating said motor corresponding to each of said scrubbing units to rotate in said second direction when said disk reaches said upper end of said track, a plurality of buttons, each of said buttons being positioned on said exposed surface wherein each of said buttons is configured to be manipulated, each of said buttons being electrically coupled to said processor, each of said buttons controlling operational parameters of said washing unit, said scrubbing unit and said drying unit, a plurality of motor conduits, each of said motor conduits being coupled to said inner surface of said housing, each of said motor conduits extending between said panel and said motor corresponding to an associated one of said scrubbing units, each of said motor conduits having a first conductor positioned therein, said first conductor being electrically coupled between said processor and said motor corresponding to said associated scrubbing unit, a dispenser conduit being coupled to said inner surface of said housing, said dispenser conduit extending between said panel and each of said dispensers, said dispenser conduit having a second conductor being positioned therein, said second conductor being electrically coupled between said processor and each of said dispensers, a dryer conduit being coupled to said inner surface of said housing, said dryer conduit extending between said panel and said drying unit, said dryer conduit having a third conductor being positioned therein, said third conductor being electrically coupled between said processor and said fan motor, and a power supply being coupled to said housing, said power supply being electrically coupled to said processor, said power supply comprising a cord extending outwardly from said housing, said cord having a distal end with respect to said housing, said distal end of said cord having a plug being electrically coupled thereto, said plug being configured to be electrically coupled to a power source.

* * * * *